July 23, 1929.   M. WADDELL ET AL   1,722,164
APPARATUS FOR TREATING FLAX FOR SPINNING
Filed Sept. 18, 1928   6 Sheets-Sheet 5

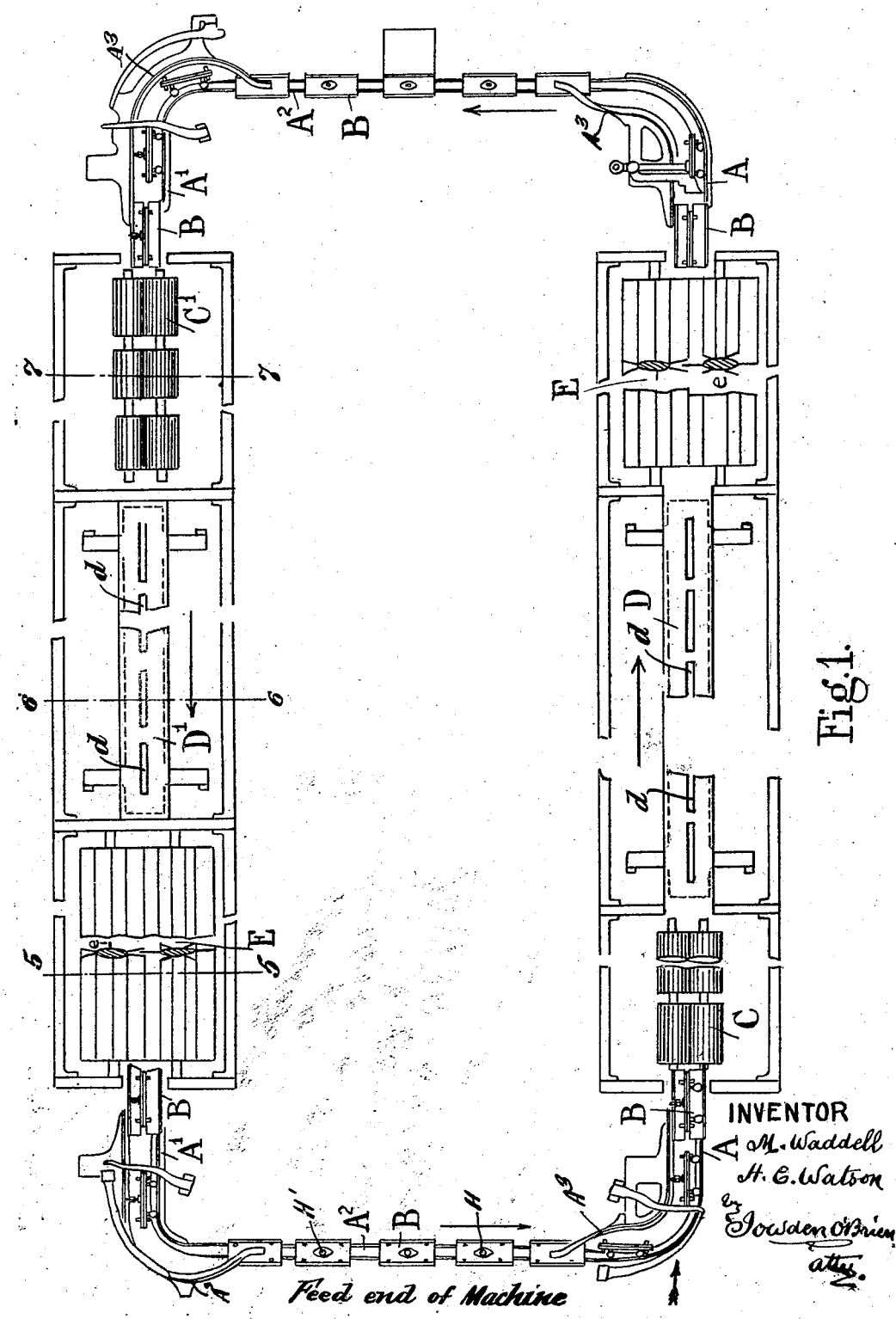

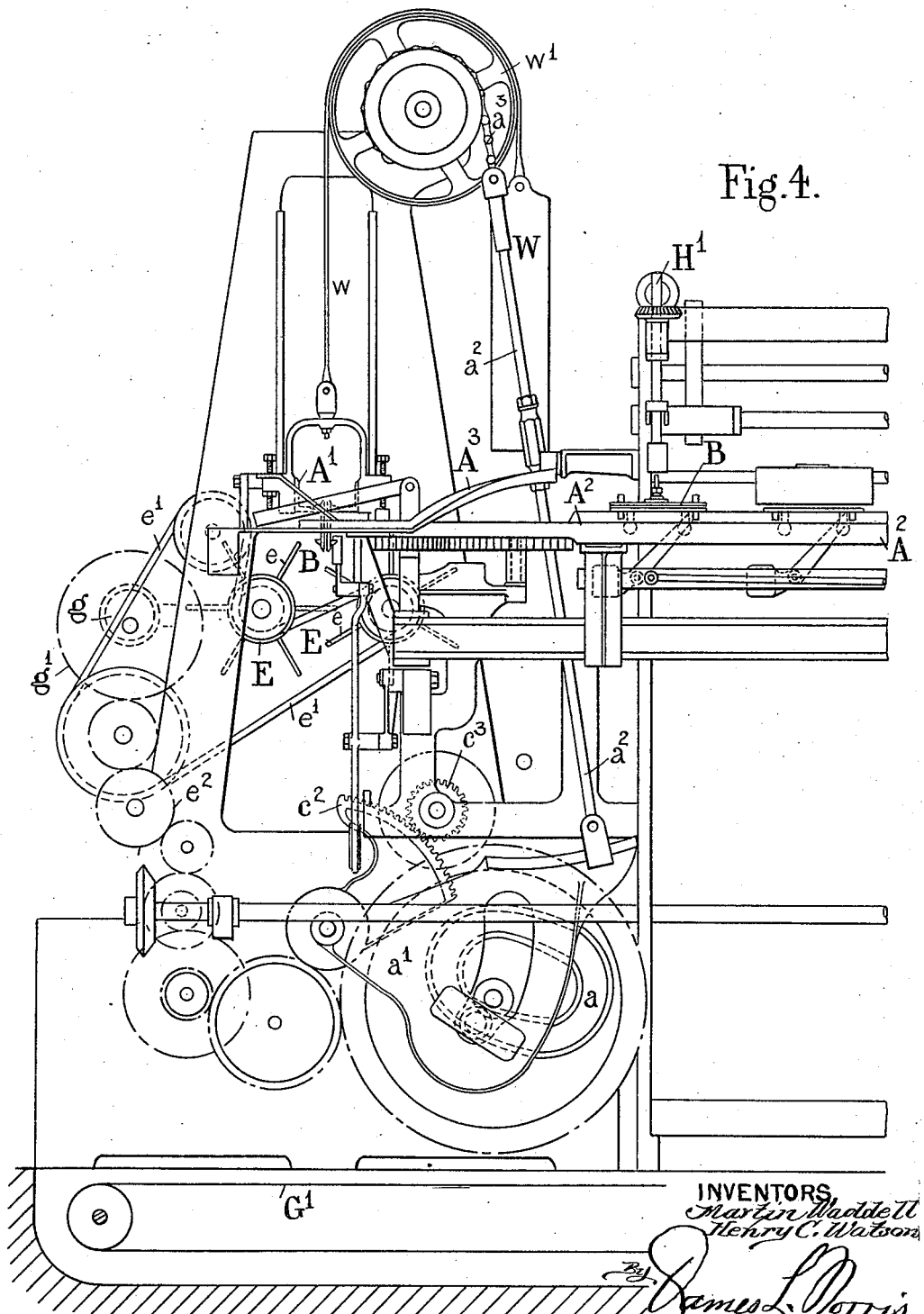

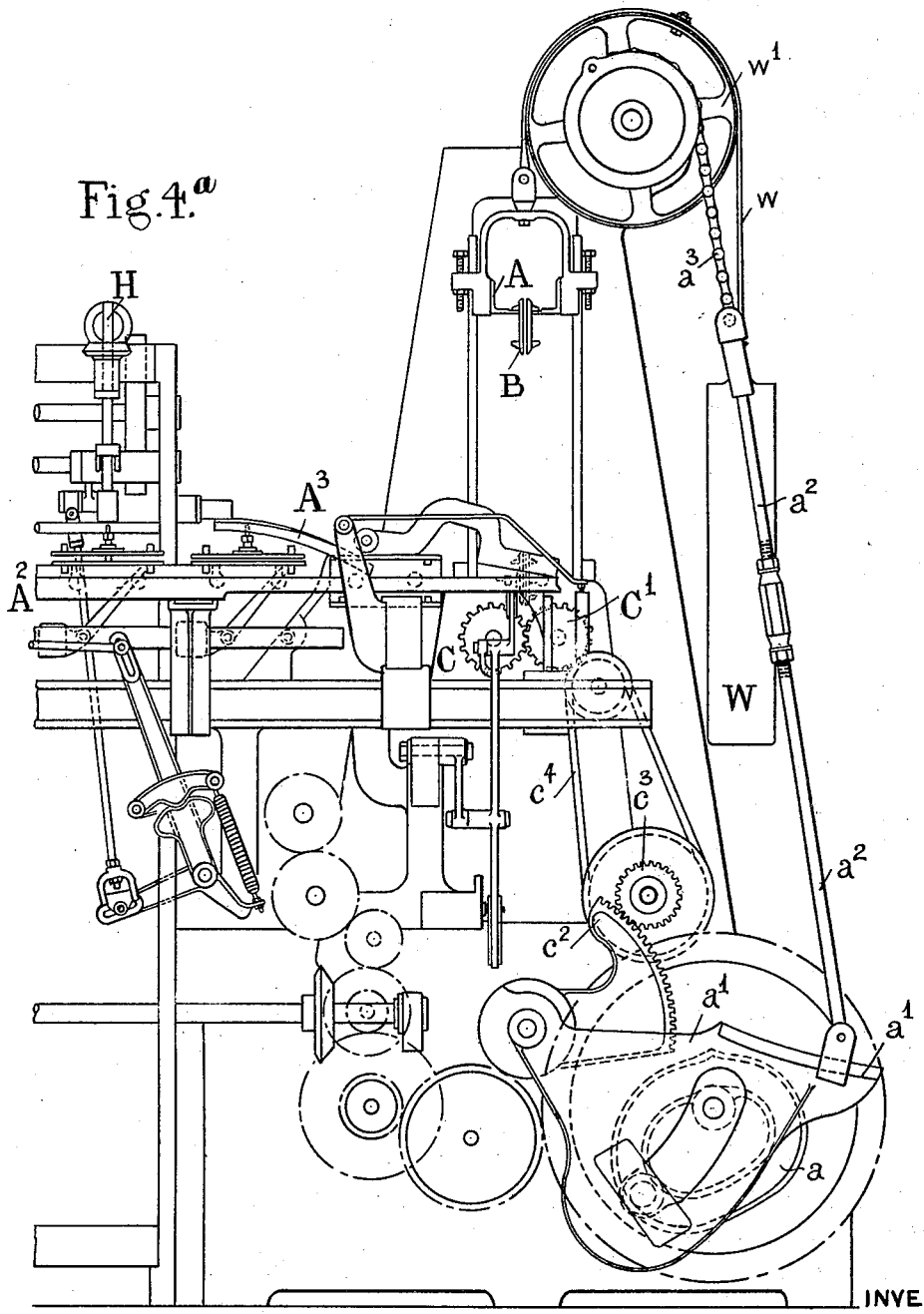

INVENTORS.
Martin Waddell
Henry C. Watson
By James L. Norris,
Attorney.

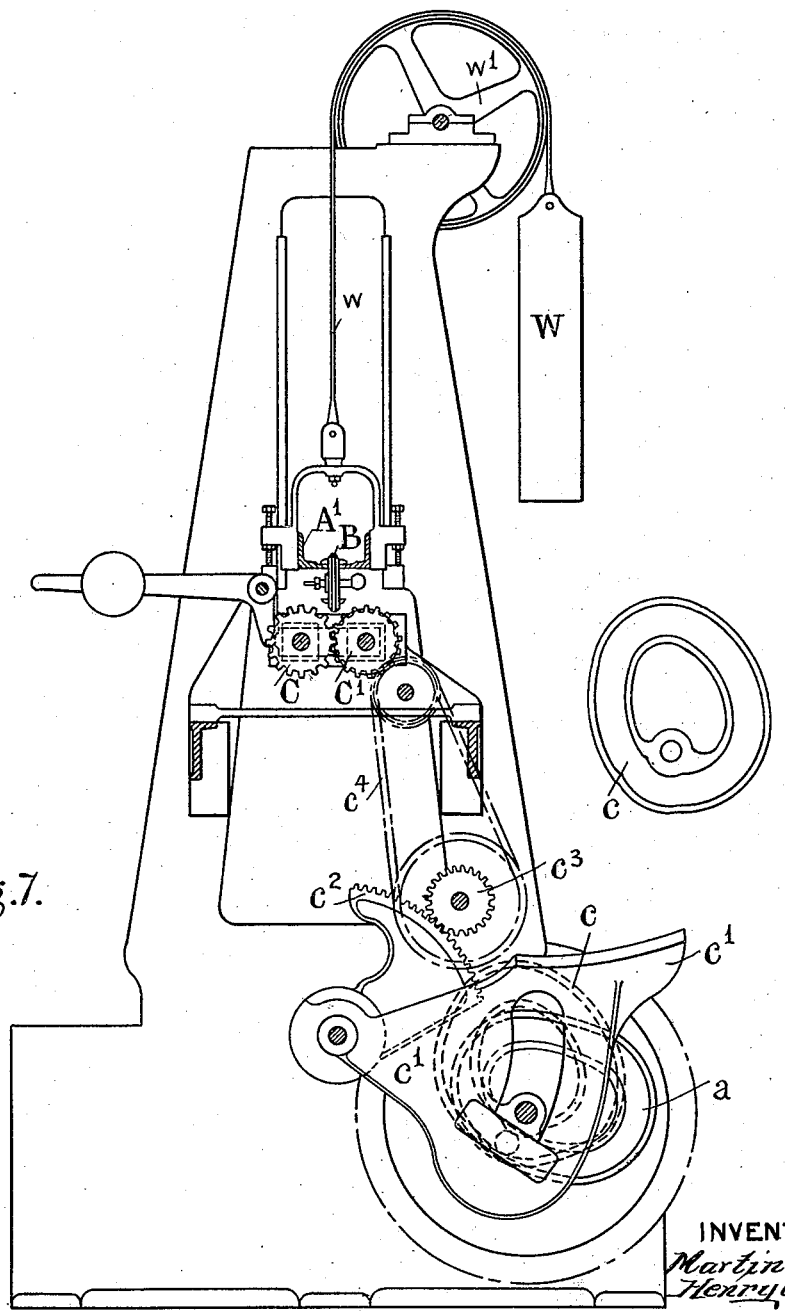

Patented July 23, 1929.

1,722,164

UNITED STATES PATENT OFFICE.

MARTIN WADDELL AND HENRY COWAN WATSON, OF BELFAST, IRELAND.

APPARATUS FOR TREATING FLAX FOR SPINNING.

Application filed September 18, 1928, Serial No. 306,664, and in Great Britain September 14, 1927.

This invention relates to the method or process of, and apparatus for the treating of stalks or straw of flax, hemp or jute to remove the seeds and woody stem portions from the fibres in preparation for spinning.

It is customary at present to "ret" the flax stalk or straw, scutch it to remove the woody portions and then to hackle it as separate operations and in the hackling process it is well known to clamp the flax stricks in holders comprising two plates screwed together the hackling machine being constructed with vertically reciprocating channels along which the holders are moved intermittently, the holders being automatically screwed at one end of the machine and unscrewed and the flax "pulled through" and rescrewed at the other end of the machine to make the operation continuous, as illustrated in U. S. Patent No. 775,352 to Reade.

According to this invention the preliminary retting is omitted and the several operations of de-seeding, breaking, rubbing, scutching with or without drying and hackling are made continuous after the flax straw has been clamped into the holders in a machine comprising de-seeding rolls, breaking rolls, rubbing plates and scutching blades with vertically reciprocating channels to support the holders, means for intermittently moving the holders along the channels as in U. S. Patent No. 775,352 and mechanism at both ends of the machine for screwing and unscrewing the holders, as in said Patent No. 775,352, pulling through the stalks and rescrewing the holders.

The invention will be fully described with reference to the accompanying drawings:—

Fig. 1 is a diagrammatic plan of machine.

Fig. 4 is an end elevation of the left hand side of the feed end of the machine;

Figures 5, 6:
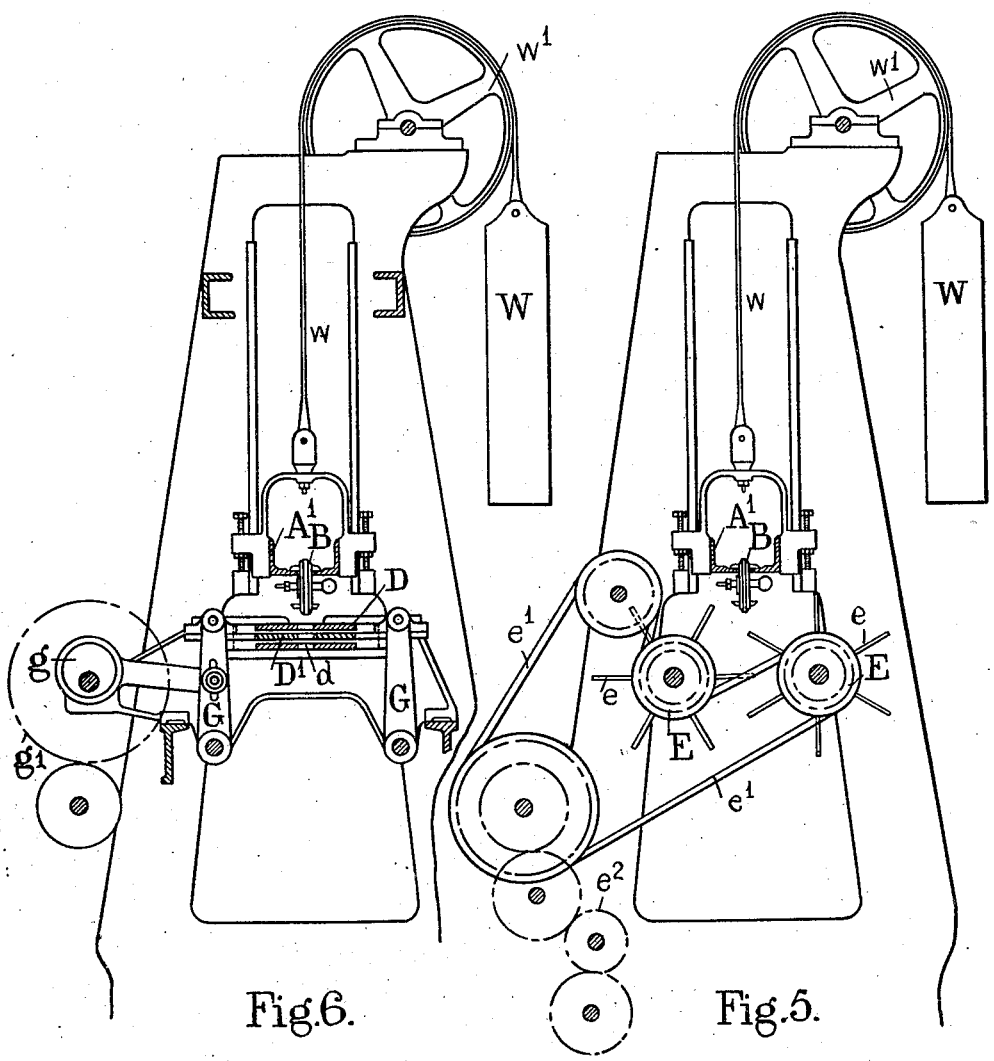

Fig. 4$^a$ is a similar view of the right hand side;

Fig. 5 is a transverse sectional elevation on the line 5—5, Fig. 1;

Fig. 6 is a transverse sectional elevation on the line 6—6, Fig. 1;

Fig. 7 is a transverse sectional elevation on the line 7—7, Fig. 1.

Referring to the drawings:—

The machine is constructed with vertically reciprocating guide channels A and A$^1$ extending longitudinally at both sides of the machine with stationary cross channels A$^2$, holders B into which the flax stalks are clamped and are intermittently traversed along the channels A, A$^1$. Duplicate sets of fluted de-seeding and breaking rolls C, C$^1$, one set at either side of the machine, are mounted to break and remove the seed balls from the flax and also break the woody constituents of the stalks. There are also provided duplicate sets of rubbing plates D, D$^1$, one set at either side of the machine, each plate formed with apertures $d$ through which the flax stalks penetrate, the plates D$^1$ having a transverse reciprocating movement between which the stalks are rubbed to further break the woody parts, duplicate sets of scutching blades E, one set at either side of the machine, to remove the woody material, and the vertically reciprocating guide channels A are placed above the rolls C, plates D and blades E at either side of the machine along which the holders B, in which the flax stalks are clamped, traverse from one end of the machine to the other.

The holders B and vertically reciprocating guide channels A, A$^1$ are similar to what are shown in the U. S. Patent No. 775,352. They are counterbalanced by weights W attached to bands $w$ passing over pulleys $w^1$. The reciprocating movement is imparted by a cam $a$, lever $a^1$, connecting link $a^2$, and chain $a^3$ attached to the side of the pulley $w^1$.

The fluted de-seeding rollers C, C$^1$ are mounted to rotate in suitable bearings and a to-and-fro rotary movement is imparted to them by a cam $c$, a lever $c^1$ (similar to the lever $a^1$), a toothed quadrant $c^2$ rocking with the lever, a toothed wheel $c^3$ with which the quadrant $c^2$ meshes, a driving band $c^4$, and gears driven thereby meshing with gears on the roller shaft.

The cams $a$ and $c$ are on opposite sides of a plate wheel and the levers $a^1$ and $c$ are mounted loose on the same shaft.

The rubbing plates comprise two stationary plates D and a centrally disposed transversely reciprocating plate $D^1$. The reciprocating plate $D^1$ is carried by two swinging or rocking arms G moved to and fro by an eccentric $g$ driven by a train of gears $g^1$ from the driving shaft.

The rotary scutching blades or drums E are driven by a band $e^1$ passing around pulleys rotated by a train of gears $e^2$ and constantly rotate in the same direction.

The holders B are constructed of two clamping plates between which the stalks of flax are placed and held together by clamping screws and are such as described in the before-mentioned U. S. Patent No. 775,352, and the holders are traversed along the guide rails by mechanism similar to that disclosed by British Patents No. 11,685 of 1903 to Reade, No. 18,480 of 1909 to Eves, and No. 5,570 of 1914 to Barbour.

At the feed end of the machine, Fig. 1, the guide channels A and $A^1$ are connected by side channels $A^2$ and swivelling brackets $A^3$ as described in U. S. Patent No. 775,352, and also with screwing mechanism H and $H^1$ for screwing up and unscrewing the clamping screw of the holders B, as described in said U. S. Patent No. 775,352.

At the opposite or change end of the machine the guide channels A and $A^1$ are connected by similar side channels $A^2$ and swivelling brackets $A^3$ with screwing mechanism for screwing and re-screwing the clamping screw of the holders B and mechanism for drawing the flax through the holders so that the part that was previously clamped within the holder may be exposed for treatment as described in U. S. Patent No. 775,352.

Below the machine are travelling conveyers $G^1$, $G^2$, by which the seeds are carried to a seed cleaning machine.

The main channels A, the cross channels $A^2$ and the mechanism for transferring the holders B from the cross channels $A^2$ to the main channels A, $A^1$, are shown and described in British Patent to Barbour, No. 5,570 of 1914, and the screwing and unscrewing mechanisms and the mechanism for putting the flax through the holder per se are described in U. S. Patent No. 775,352, the invention consisting essentially in the combination with such channels, transferring mechanism, screw clamping mechanism and change mechanism which have been applied to hackling machines of the de-seeding, breaking and scutching mechanism shown and described.

In carrying out the invention the flax stalks or straw as they are pulled or cut in the field after being dried but without being retted are in the form of small sheaves or stricks or pieces, clamped in the holders B comprising two plates screwed or bolted together from which the ends of the stalks depend and between which the stalks are retained during the preliminary processes.

The holders B with the stalks depending therefrom are mounted in the guide channels A to which an ascending and descending movement is imparted by cam or eccentric $a$.

The flax stalks in the holders B are traversed along the channel A or $A^1$ over a series of fluted breaking rollers C, $C^1$ of which there are a number of pairs which revolve alternately in different directions. The flax is lowered between the rollers and withdrawn again as the channels and holders descend and ascend and burst the seed pods to remove and recover the seed and to break the woody stem. The space between the flutes of the first pair of rollers are sufficiently far apart as to burst the seed balls without crushing or damaging the seed. The rollers are so arranged that their receiving speed is less than the speed of the descending channels A and holders B containing the flax straw, and arranged that, at the reverse when the channels A and holder containing the straw begins to ascend, the rollers give out quicker than the ascent of the channel and holder. This gives the "slack" during descent and ascent of the holder containing flax straw.

The holders B containing the broken straw after leaving the fluted rollers C are traversed along the channel to a rubbing mechanism comprising a fixed plate D with a slot, through which the straw descends, and a reciprocating plate $D^1$ with a slot, through which the straw descends or passes, and another fixed plate D below the reciprocating plate. When the straw is going through the three slotted plates, the woody part of the straw which has been broken by the rollers C, $C^1$ is rubbed and becomes detached and falls away from the fibres. The chaff and seed falling from the breaking rollers and rubbers are conveyed by conveyors G, $G^1$, or blown by fans to a seed cleaning machine of known type not shown. A similar set of rubbing plates may be set below the de-seeding rollers.

Figure 3:
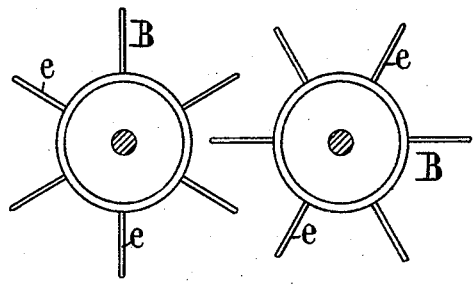
Fig. 3 is an end elevation of scutching blades.
Figure 2:
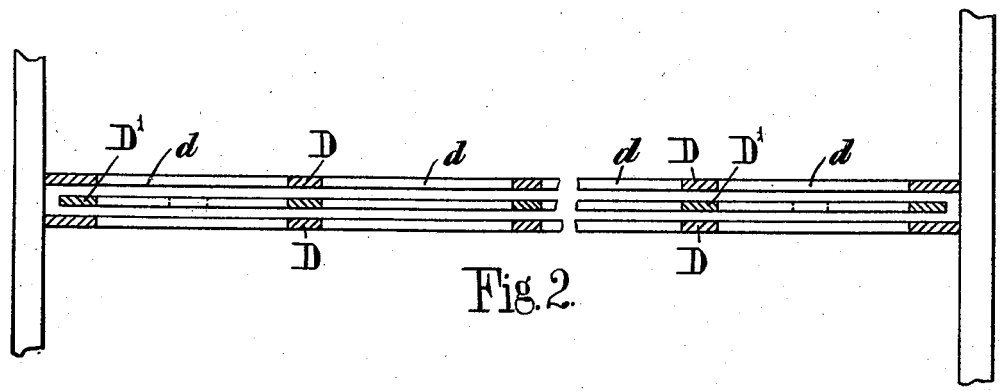
Fig. 2 is a slide elevation of rubbing blades.

The holders B containing the now broken and rubbed straw after leaving the rubbing plates are traversed to the scutching blades E which may be either of the beating type, that is, like a propeller blade; or the type which consists of blades $e$ fixed to the surface of a revolving drum as in Fig. 3. The blades may be straight or in a spiral or screw; or similar to the first type but with the ends or tips, so to speak, of the propeller blades fixed to the surface of a revolving drum.

The holders B containing the broken and scutched straw pass along the transverse channel A² to the corresponding mechanism at the other side of the machine the transverse channel A² being fitted with unscrewing mechanism "pull through" mechanism and rescrewing mechanism of known construction such as used on hackling machines.

At the other side of the machine, as in U. S. Patent No. 775,352, the other ends of the flax stalk undergo operations similar to those already described.

What we claim as our invention and desire to protect by Letters Patent is:—

1. Apparatus for treating flax straw in a continuous manner, comprising, in combination, holders for clamping stricks or bunches of flax straw, vertically reciprocating channels at both sides of the machine along which the holders and flax carried thereby are movable, stationary cross channels and mechanism for closing and opening said holders at both ends of the machine, two sets of fluted rollers at both sides of the machine and revolving alternately in different directions to remove the seeds and crush the woody material, two sets of transversely reciprocating rubbing plates at both sides of the machine to further break the woody material, and two sets of scutching blades at both sides of the machine to remove the broken woody shive.

2. Apparatus for treating flax straw in a continuous manner, comprising, in combination, holders for clamping stricks or bunches of flax straw, vertically reciprocating channels at both sides of the machine along which the holders and flax are movable, stationary cross channels and mechanism for opening and closing said holders, at both ends of the machine, two sets of fluted rollers at both sides of the machine and revolving alternately in different directions to remove the seeds and crush the woody material, two sets of transversely reciprocating rubbing planes at both sides of the machine to further break the woody material, and two sets of scutching blades at both sides of the machine to remove the broken woody shive and a set of hackle sheets at both sides of the machine to separate the fibres.

In testimony whereof we have hereunto set our hands.

MARTIN WADDELL.
HENRY COWAN WATSON.